(12) United States Patent
Itoh et al.

(10) Patent No.: US 8,499,143 B2
(45) Date of Patent: Jul. 30, 2013

(54) METHOD FOR SHORTENING THE BOOT TIME OF A COMPUTER SYSTEM

(75) Inventors: Hiroshi Itoh, Sagamihara (JP); Akihiko Mizutani, Zushi (JP); Susumu Shimotono, Hadano (JP); Kunihiko Miwa, Hiratsuka (JP)

(73) Assignee: Lenovo (Singapore) Pte Ltd, Singapore (SG)

( * ) Notice: Subject to any disclaimer, the term of this patent is extended or adjusted under 35 U.S.C. 154(b) by 400 days.

(21) Appl. No.: 12/910,980

(22) Filed: Oct. 25, 2010

(65) Prior Publication Data

US 2011/0113229 A1 May 12, 2011

(30) Foreign Application Priority Data

Nov. 12, 2009 (JP) ................................ 2009-258469

(51) Int. Cl.
*G06F 1/24* (2006.01)
*G06F 15/177* (2006.01)
*G06F 9/00* (2006.01)

(52) U.S. Cl.
USPC .................................. 713/2; 713/1; 713/100

(58) Field of Classification Search
USPC ........................................................... 713/2
See application file for complete search history.

(56) References Cited

U.S. PATENT DOCUMENTS

| 7,181,609 B2 * | 2/2007 | Connor et al. ..................... 713/2 |
| 7,395,422 B2 * | 7/2008 | Norton .............................. 713/2 |
| 7,783,875 B2 * | 8/2010 | Oddiraju et al. .................. 713/2 |
| 8,010,964 B2 * | 8/2011 | Glicklich et al. ............. 718/100 |
| 8,060,734 B1 * | 11/2011 | Newstadt et al. ................. 713/1 |
| 2006/0277402 A1 * | 12/2006 | Wakabayashi .................... 713/1 |

FOREIGN PATENT DOCUMENTS

| JP | 2005-332405 | 12/2005 |
| JP | 2006-323549 | 11/2006 |
| JP | 2007-323629 | 12/2007 |
| JP | 2009-217711 | 9/2009 |
| JP | 2010-211596 | 9/2010 |

* cited by examiner

*Primary Examiner* — Suresh Suryawanshi

(74) *Attorney, Agent, or Firm* — Antony P. Ng; Yudell Isidore Ng Russell PLLC

(57) ABSTRACT

A computer system having an operating environment configured for enabling boot up in a relatively short time is disclosed. A hard disk is utilized to store a boot file. A run process list registers a process to be run during boot up. When the computer system is being booted up, if the run process list registers a process to load the boot file, a process control unit does not control a process management unit, so that the process is run as usual. If the process is not registered, the process management unit suspends the process. When the suspended process is called by another process later, the process control unit makes the process resumed on demand.

18 Claims, 9 Drawing Sheets

METHOD FOR SHORTENING THE BOOT TIME OF A COMPUTER SYSTEM

PRIORITY CLAIM

The present application claims benefit of priority under 35 U.S.C. §§120, 365 to the previously filed Japanese Patent Application No. JP2009-258469 entitled, "Computer that Boots Up Fast" with a priority date of Nov. 12, 2009, which is incorporated by reference herein.

BACKGROUND

1. Technical Field

The present invention relates to computer systems in general, and in particular to a method for shortening the boot time of a computer system.

2. Description of Related Art

After a computer has been switched on, the computer starts a boot process (also known as bootstrap) to load a series of boot files from a boot disk into a main memory. The loaded boot files enable a user to run various application programs for operation. The boot process should be completed in a relatively short time because the size of the boot files is relatively small. However, after the computer has been used for many years, during which the user might have installed various programs therein, these programs were incorporated into the boot files and auto-run without the knowledge of the user. As a result, the time to complete the boot process is lengthened.

One prior art solution for reducing computer boot time is by defining a device, a driver and an application to be activated in a computer so as to correspond to an item of service selected, and when any item of service is selected, only the device, the driver and the application in the computer corresponding to the selected item of service are activated in order to implement simple booting. Another prior art solution provides multiple boot modes, and an appropriate one of the boot modes is selected to boot a computer in order to minimize the time required for booting.

When booting a computer, a user wants to execute a specific operation, such as reading emails, browsing websites, preparing documents, etc., as soon as possible. However, not only in a computer used for a long time but also even in a computer immediately after starting to use, boot files are not always limited to the minimum range required to provide an operation environment the user needs.

FIG. 10 illustrates a typical state of loading a boot file in a computer. During booting, an operating system (OS), such as Windows® OS, is configured to automatically load modules such as kernel, Service 1, Service 2, and Subsystem 1 in a predetermined order. Then, Explorer of the OS automatically loads Application 1 registered in startup or in a registry. The modules of the OS and Explorer serve as a parent process to create a process of a module to be loaded.

When Application 1 is run, Service 1 and Service 2 are called for running. When the boot up process has been completed, the user clicks an icon to run Application 2 through Explorer. Along with the running of Application 2, Subsystem 1 and Subsystem 2 are called for miming. Subsystem 1 is not used by any module before it is shutdown. Assume that a user boots the computer in order to use Application 2 for document preparation, to which the user conducted an operation for running. On the other hand, Services 1, 2 and Application 1 have nothing to do with the running of Application 2 and Subsystem 1 simply may run during the running of Application 2, and therefore they may be deleted from the boot file.

As the amount of the boot file is reduced, the boot time will be shortened. However, if a part of the boot file configured by the computer is deleted without discretion, the computer may stop or the operation of the computer may become unstable. Therefore, it would be desirable to provide a method for shortening the boot time of a computer system without interfering other computer operations.

SUMMARY

In accordance with a preferred embodiment of the present invention, a computer includes a boot medium having a boot file. The computer is provided with a process list having a process permitted to run or a process suspended during booting registered therein. In response to the computer being boot up, a process loading the boot file is run or suspended according to the process list. After the completion of the boot up, an application program is executed. Any suspended process is resumed in response to the application program being executed.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A. Definitions

A boot file may be a program, a program module, a file, code or the like that is automatically loaded into a main memory after a computer is switched on. The completion of a boot process can be decided based on a CPU usage of the computer as a whole being lowered than a predetermined value. The CPU usage Y of the computer as a whole can be calculated by the following formula:

$$Y = [1-(U_i+K_i)/E_t] \times 100\%$$

where $U_i$ denotes a user mode time of an idle process, $K_i$ denotes a kernel mode time of the idle process, and $E_t$ denotes an elapsed time.

Running a process refers to a state where, in an operating system (OS) performing preemptive multitasking, a process to run a program transits between a run state and a ready state. A suspend state of a process refers to a state where a process to run a program is out of a run state because a specific Application Program Interface (API) function is called and the process does not transit to a ready state unless a specific API function for resume is called. A not-run process refers to a process that is not yet created to load a program and a process that is not created for running, even though the program has been loaded. Although a process in a suspend state as well as a not-run process are not run, the process in a suspend state is once run and can be resumed by monitoring interprocess communication when it is called from another process, and therefore a process in a suspend state can be distinguished from a not-run process.

B. Configuration of a Computer System

Figure 1:
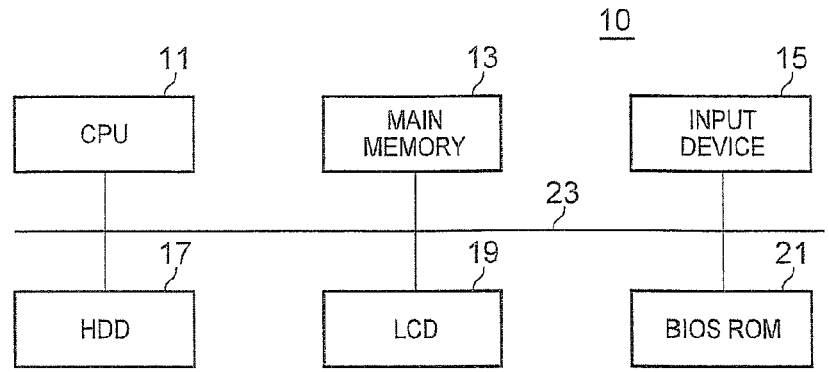
FIG. 1 is a block diagram of a computer system.

FIG. 1 is a block diagram illustrating the hardware configuration of a computer system in which a preferred embodiment can be implemented. As shown, a computer system 10 includes a CPU 11, a main memory 13, an input device 15, a hard disk drive (HDD) 17, a liquid crystal display (LCD) 19, a BIOS ROM 21, each being connected to a bus 23. The HDD 17 is a boot disk storing a boot file. Descriptions for functions of the above-mentioned hardware devices are omitted because they are well-known.

C. Configuration of Software

Figure 2:
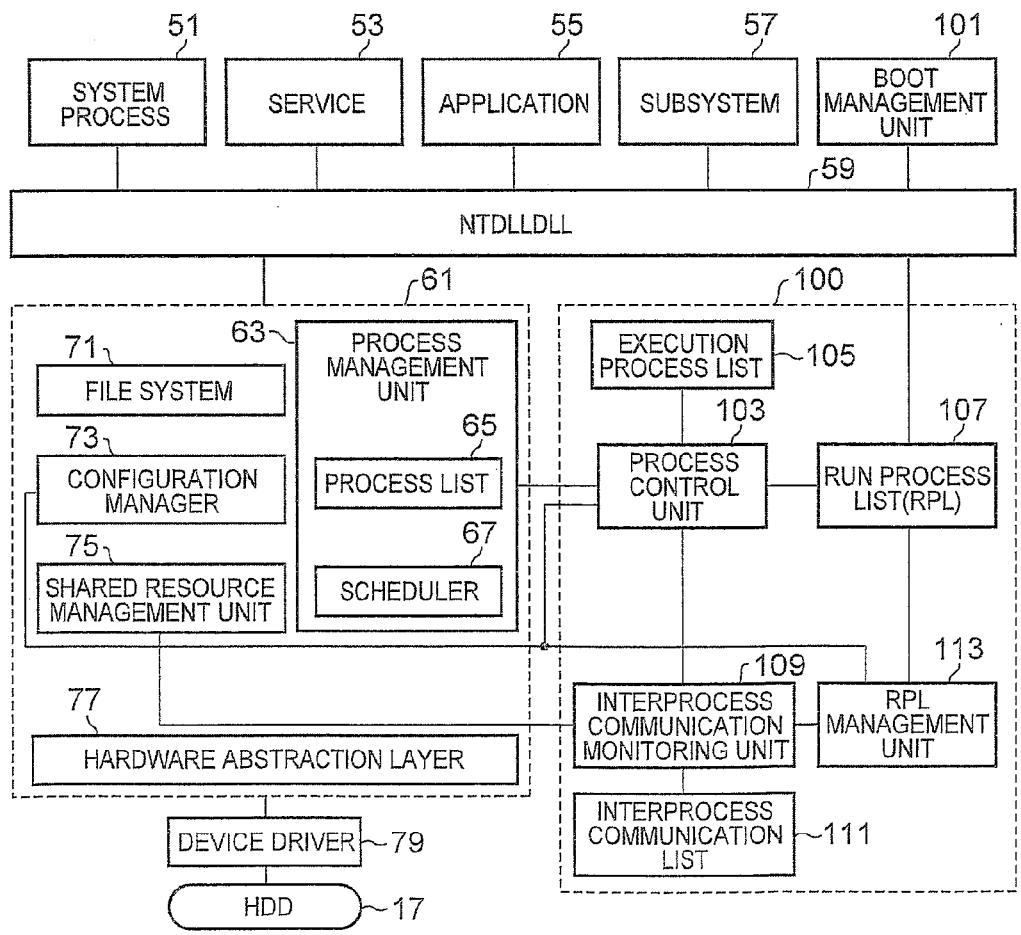
FIG. 2 is a block diagram of a software configuration for configuring an operation environment according to the present invention.

FIG. 2 is a functional block diagram of a software configuration for configuring an operation environment according to the present invention. The block diagram of FIG. 2 exemplifies Windows® as an OS, and simply illustrates functions of software required for the description of the present invention. It should be noted that the present invention is not limited to Windows® as an OS, and is applicable to other multitasking OSs equipped with an API function required to embody the present invention. Functions of the elements illustrated in FIG. 2 are implemented in the computer 10 when programs stored in the HDD 17 have been loaded into the main memory 13 during booting and are run by the CPU 11.

In FIG. 2, a boot management unit 101 is a part of a boot system 100, and elements other than the boot system 100 are well-known. A system process 51 includes a session manager, Winlogon, a service control manager and the like. A service 53 is a process operating in the background without an operation by a user, such as Service.exe, SpoolSv.exe, WinMgt.exe and the like. An application 55 includes a user application, Explorer, Task Manager and the like.

A subsystem 57 is configured with an environment subsystem process, a kernel mode device driver, a subsystem DLL and the like. A NTDLL.DLL 59 is a support library that provides a function to use subsystem DLL, configured with an interface function (System Service Dispatch Stub) that can be called from a user mode and an internal support function the sub system DLL uses. A kernel 61 is a basic component of the OS, including a process management unit 63, a file system 71, a configuration manager 73, a shared resource management unit 75, a hardware abstraction layer 77 and the like.

The process management unit 63 includes a process list 65, a process scheduler 67 and the like, and manages creation, run, standby, and termination of a process and a thread. The process list 65 provides a list of processes that are currently created in the computer 10. The process scheduler 67 lets a created process transit between a run state (RUN) and a ready state (READY) according to a predetermined algorithm to perform preemptive task switch.

The file system 71 creates a File Allocation Table (FAT) and a directory to manage recording, loading deleting, or moving files relating to the HDD 17. The file system 71 stores data of the HDD 17 referred to lately in the main memory 13, and includes a cache manager that speeds up the following I/O processing. The configuration manager 73 manages a system registry and startup. The system registry registers information on a process that automatically runs without operations by a user during booting. The startup registers components of the OS a user selects running or stopping for booting. Processes registered in the registry and in the startup are auto-run (AutoRun) by OS Shell Startup during booting.

The shared resource management unit 75 manages shared resources used for interprocess communication. The interprocess communication refers to a scheme to perform exchange of information between processes each provided with a unique virtual address space, which can use various methods including message queue, socket pipe, shared memory and the like. A shared resource can be configured as follows. In a shared area of a main memory formed with a CreatePipe function, data written by a certain process that calls a WriteFile function is loaded by another process that calls a ReadFile function. The hardware abstraction layer 77 smooths out discrepancies of hardware platform for abstraction.

The boot system 100 includes the boot management unit 101, a process control unit 103, an execution process list 105, a run process list (RPL) 107, an interprocess communication monitoring unit 109, an interprocess communication list 111, and a RPL management unit 113. The boot management unit 101 configures a part of the user application 55, and provides, to the user, information on a run process and a configuration screen to edit the RPL 107. When detecting a process that is not registered with the RPL 107 in the process list 65, the process control unit 103 calls an API function and makes the process suspended through the process scheduler 67. The process control unit 103 calls an API function for a process notified from the interprocess communication monitoring unit 109 and makes the suspended process resumed. When the process control unit 103 detects a process that runs the suspended process, the process control unit 103 makes the process resumed.

The execution process list 105 is a list of all processes run by the computer 10. A run process transits between a run state and a ready state. The execution process list 105 can be a list of types of processes including a process that is never run after the program is introduced, a process that is run only immediately after the introduction, a process that is never run within the latest one week, and a process that is never booted within the latest ten boots, for example. The RPL 107 is a list registering identifiers of processes that are permitted to run or that are not suspended among multiple processes to load a boot file. A method to create the RPL will be described in detail in FIG. 4.

The interprocess communication monitoring unit 109 monitors interprocess communication conducted via the shared resource management unit 75, and registers a dependence of processes including a caller process and a callee process with the interprocess communication list 111. The dependence of processes is information indicating, for example, when processes B, C and D are to be called for the running of process A, association of the running of process A and processes B, C, and D. As described later, the registration of process dependence leads to the advantage that, when process A is run during suspension of processes B, C and D, the processes B, C and D can be resumed earlier than detecting of interprocess communication calling processes B, C and D by the shared resource management unit 75, thus shortening the running time. The RPL management unit 113 registers, with the RPL 107, minimum required processes to boot the OS based on the actual usage of the computer 10 by a user.

D. Process Transition

Figure 3:
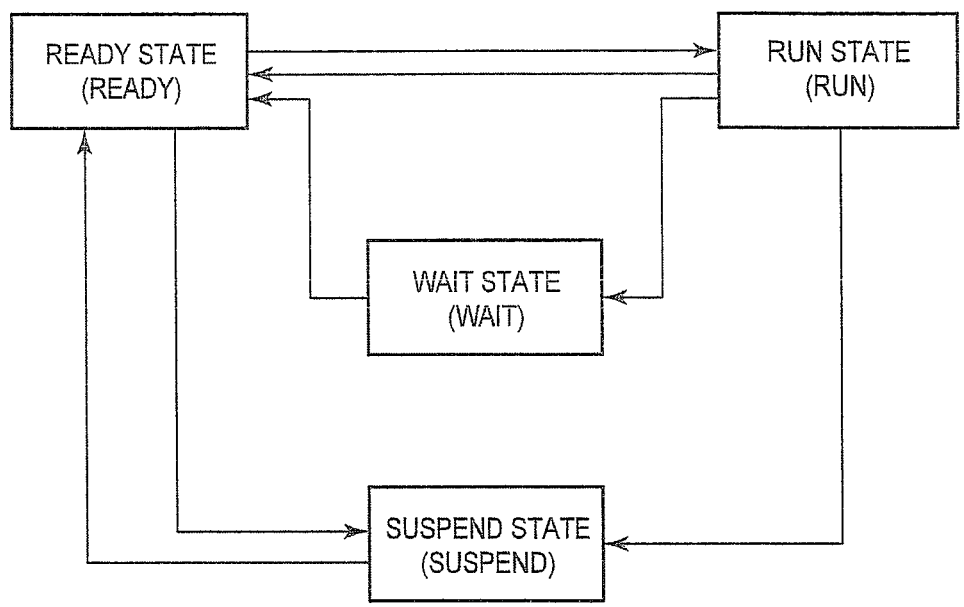
FIG. 3 illustrates a state of a process created by a computer when the process is controlled by a process management unit for transition before termination.

FIG. 3 illustrates a state of a process created by the computer 10 where the process is controlled by the process management unit 63 for transition before termination. The process is a data structure called a process control block (PCB) including a processor state, process priority, time slice information, a process ID, device information and the like. The processor state is information on a state of a register, a stack, a program counter and the like when the CPU 11 suspends the process, which is called context also. The process priority is information indicating priority of a context switch among processes. The time slice information is information on an initial value of time slice and the remaining time. The time slice is a maximum running time allowed for a process when the process obtains one execution right for the CPU 11. The process ID is a unique number allocated to each process. The device information is identification information of a device allocated to the process. The PCB may contain other various types of information depending on the OS.

The run state (RUN) is a state where a process is currently run by the CPU 11, and after consuming the allocated time slice, the state transits to a ready state (READY). The ready state (READY) is a state where the process is ready and waits for running in the order of priority, where the process scheduler 67 dispatches PCBs registered in a ready queue to the CPU 11 in a predetermined order. The running wait state (WAIT) is a state where the process waits for running by calling a function stopping the running by itself until a certain condition such as I/O is established. The suspend state (SUSPEND) is a state where the process is forced to be in a wait state by another process.

In order for a certain process to make another process transit from a run state or a ready state to a suspend state or resumed from a suspend state to transit to a ready state, a specific API function can be called. At this time, when the OS does not provide an API function to directly suspend or resume a process, an API function covering all threads created by the process as a target of suspending and resuming can be called to implement suspending/resuming.

E. Procedure to Create a RPL

In the present embodiment, a process of a program included in a boot file and automatically loaded is suspended/stopped in accordance with the RPL 107. A program that can be run on demand and a program called only from a program run on demand are suspended during booting, and then are resumed on demand after booting, whereby the boot time can be shortened, while securing the running of the suspended programs. Herein, on-demand refers to running in response to a user's operation and running called by a program that is run in response to a user's operation, as opposed to a program automatically loaded and run during booting. Table I illustrates a program as a target of suspend/resume in the present invention.

TABLE I

| PROGRAM TYPE | BOOT-UP TYPE | CONTROL TARGET | GROUP |
|---|---|---|---|
| OS KERNEL | AUTO |  | 1 |
| OS SERVICE/ | AUTO | ○ | 2 |
| DEVICE DRIVER/ SUBSYSTEM | ON DEMAND |  | 3 |
| APPLICATION/ | AUTO | ○ | 4 |
| SERVICE/ DEVICE DRIVER | ON DEMAND |  | 5 |

The programs illustrated in FIG. 2 can be classified into five different groups as shown in Table I. Table I indicates classifications for the five groups, including a classification for boot-up as to whether it is included in a boot file or not, and a classification as to whether it becomes a control target for suspend/resume. Kernel belonging to a first group is configured with programs essential to run the computer 10, which are excluded from the control target for suspend/resume. Thus, the kernel is loaded in the order designated by the OS during booting. Programs belonging to a second group, which are included in a boot file and set so as to be automatically loaded among services of the OS, device drivers and subsystems of the OS, become a control target for suspend/resume.

Programs belonging to a third group, which are set so as to be run on demand among services of the OS, device drivers and subsystems of the OS, are excluded from a control target for suspend/resume. Programs belonging to a fourth group, which are set so as to be automatically loaded among applications, services for applications and device drivers introduced later, become a control target for suspend/resume. Programs belonging to a fifth group, which are set so as to be run on demand among applications, services for applications and device drivers introduced later, are excluded from a control target for suspend/resume.

Figure 4:
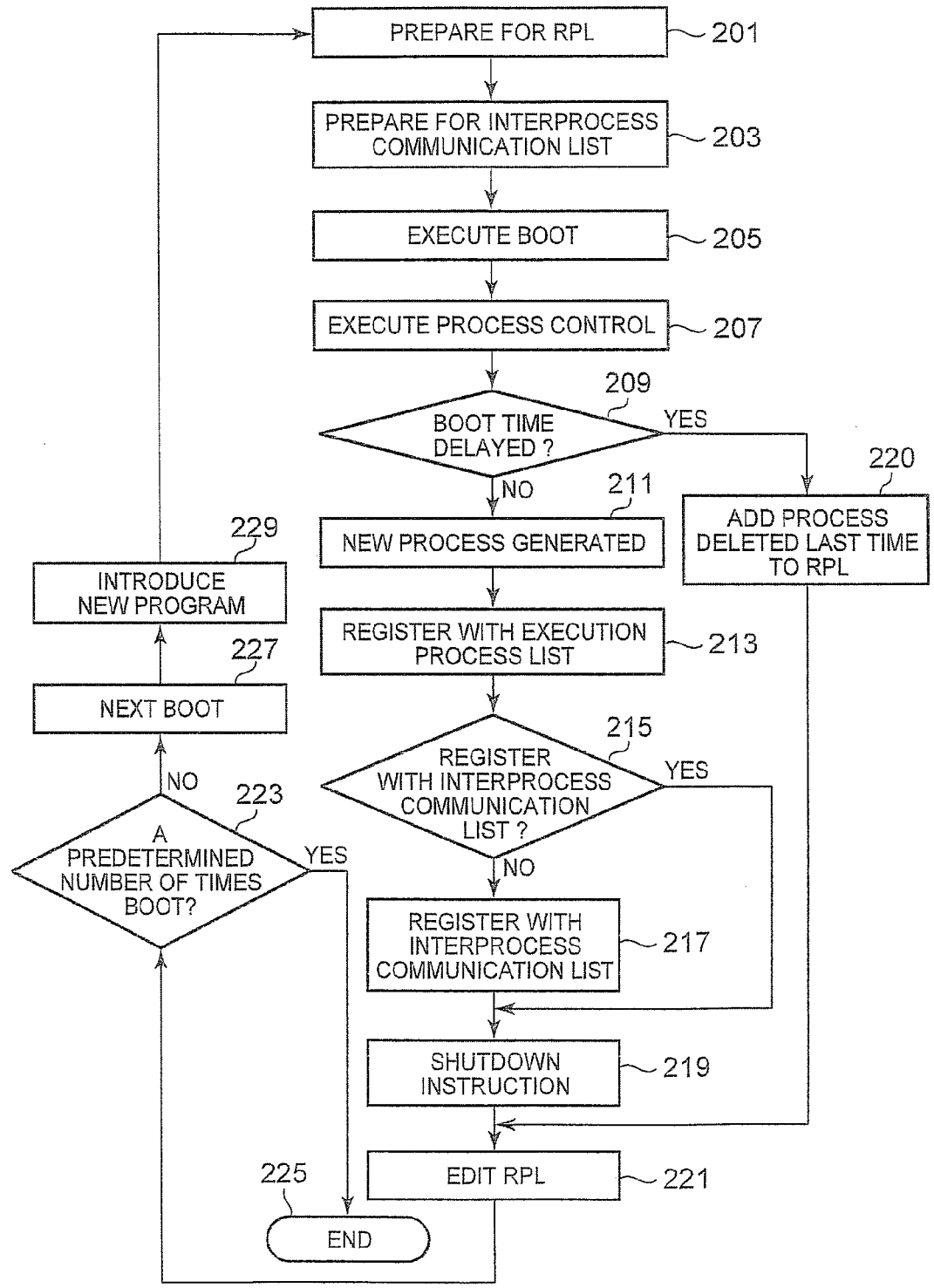
FIG. 4 is a flowchart of a method for generating a RPL.

FIG. 4 is a flowchart of a method for generating a RPL. The RPL 107 is referred to by the process control unit 103 so as to control suspend/run of processes to load a boot file. At block 201, the RPL 107 is loaded into the main memory 13. As the number of processes registered with the RPL 107 becomes smaller, the boot can be completed in a shorter time so as to configure a running environment for a specific application. However, if a process required for the computer operation is excluded from the RPL 107, the operation of the computer might stop, become unstable, or delay the boot, and therefore processes registered have to be selected appropriately. In the present embodiment, processes to be registered are selected based on the usage of the computer 10, thus creating the RPL 107. First, the process control unit 103 registers, with the RPL 107, all processes stored in the HDD 17 and corresponding to executable programs registered with the registry of the configuration manager 73. At block 203, a blank interprocess communication list 111 with any process dependence not registered therein is loaded in the main memory 13.

At block 205, the computer 10 is switched on to execute boot. At block 207, the process control unit 103 conducts controls for suspend/run to the processes created during booting in accordance with the RPL 107, the detail of which will be described later referring to FIG. 6. After the completion of boot, at block 209, the process control unit 103 determines whether this boot time is longer or not than the last boot time by a predetermined time length. The procedure of FIG. 4 repeatedly conducted by executing the boot several times possibly leads to a decrease in boot time at first but an increase in boot time at a certain timing. At this time, the increase in boot time means that a process to be registered with the RPL 107 has been deleted and was suspended during booting.

When the boot time is not delayed, the process goes to block 211. At block 211, when a user starts to use the computer, a process is generated relating to a program such as an application newly run after booting. Such a process includes a process to run a program in response to a user's operation and a process called by the process for running. At block 213, the process control unit 103 acquires all processes run by that time from the process management unit 63 and registers the same with the execution process list 105.

At block 215, the interprocess communication monitoring unit 109 acquires information on interprocess communication from the shared resource management unit 75, and determines whether or not a dependence including a caller process and a callee process is registered with the interprocess communication list 111. When it is not registered, at block 217, the interprocess communication monitoring unit 109 registers the process dependence with the interprocess communication list 111. At block 219, a shutdown instruction is issued to the computer 10 through the input device 15. In accordance with the shutdown instruction, at block 221, the RPL management unit 113 selects a process to be deleted from the RPL 107. The RPL management unit 113 acquires a list of the all processes corresponding to all executable programs stored in the HDD 17 and registered in the registry of the configuration manager 73, compares the same with the execution process list 105, and deletes, from the RPL 107, not-run processes corresponding to not-run programs that are understood but not yet run.

The not-run processes include a process corresponding to a loaded program and a process corresponding to a not-loaded program. The RPL management unit 113 further refers to the interprocess communication list 111 and the configuration manager 73 to determine that a callee process that is not registered in the registry or startup as a target of auto-run and is called by a process as Explorer of Windows® is a process to run a program called by a program run in accordance with a user's operation, and deletes such a process from the RPL 107. Thus, the processes left in the RPL 107 include mainly a process of a program that is booted for running as a structure of the OS among the all executable processes and a process that is called by the process for running. As a result, processes that do not interfere with the operation of the computer 10 when the processes are run on demand have been deleted from the list.

Figure 5:
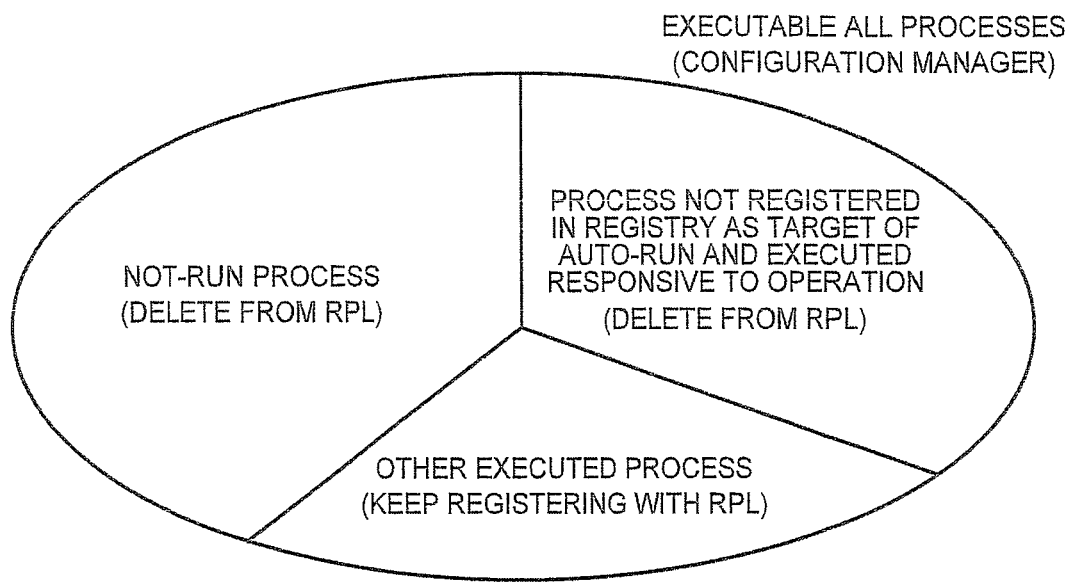
FIG. 5 illustrates a state of deleting an unnecessary process from all executable processes to create a RPL.

FIG. 5 illustrates a state of deleting a predetermined process from all executable processes to create the RPL 107. FIG. 5 illustrates all processes corresponding to all executable programs registered with the registry at this boot time being configured with a not-run process, a process that is out of an auto-run target and is called from a process run in response to a user's operation, and other run processes. In this case, the RPL 107 registers the "other run processes."

At block 209, if this boot time is delayed, it is expected that an important process has been deleted from the RPL 107 used for this boot and a process in a suspend state cannot be run. At block 220, the RPL management unit 113 returns, to the RPL 107, processes deleted from the RPL 107 during the time between the last boot and this boot. Then, at block 221, the RPL management unit 113 can make the thus returned processes out of a deletion target in the next boot or later. A user can set, through the boot management unit 101, a predetermined number of OS core processes as processes that are prohibited from deletion from the RPL 107 beforehand.

At block 223, the boot management unit 101 determines whether boot has been conducted a predetermined number of times or not. The predetermined number of times is preferably decided so as to include all operation environments where a user may use the computer such as browsing of Web sites, document preparation, image data editing, and reproduction of moving images. When the boot has been finished the predetermined number of times, the RPL 107 registers minimum required processes for boot that can be ready to any user's usage environment. After switched on the computer, control for running permission and suspending is conducted using the RPL 107, whereby the computer can arrive at such an operation environment in a short time. At block 225, the RPL management unit 113 finishes editing of the RPL 107, and the process control unit 103 uses the edited RPL 107 to run process control at the next boot. A method for process control will be described in FIG. 6.

At block 227, in order to further continue the editing of the RPL 107, the next boot is conducted after shutdown of the computer 10. Then, at block 229, a new program may be introduced into the computer 10. The RPL management unit 113 may make all of the newly introduced programs after the completion of the editing of the RPL 107 and a service program called only from the program not registered with the RPL 107. Alternatively, the RPL management unit 113 may make all programs introduced after introduction of the OS into the computer 10 not registered with the RPL 107. This is because suspension of such programs does not interfere with the boot of the OS that has operated normally until that time, and such programs can be run on demand. At the next boot, the procedure returns from block 229 to block 201, whereby the RPL management unit 113 edits the RPL 107 in the next operation environment.

F. Procedure of Process Control Using a RPL

Figure 6:
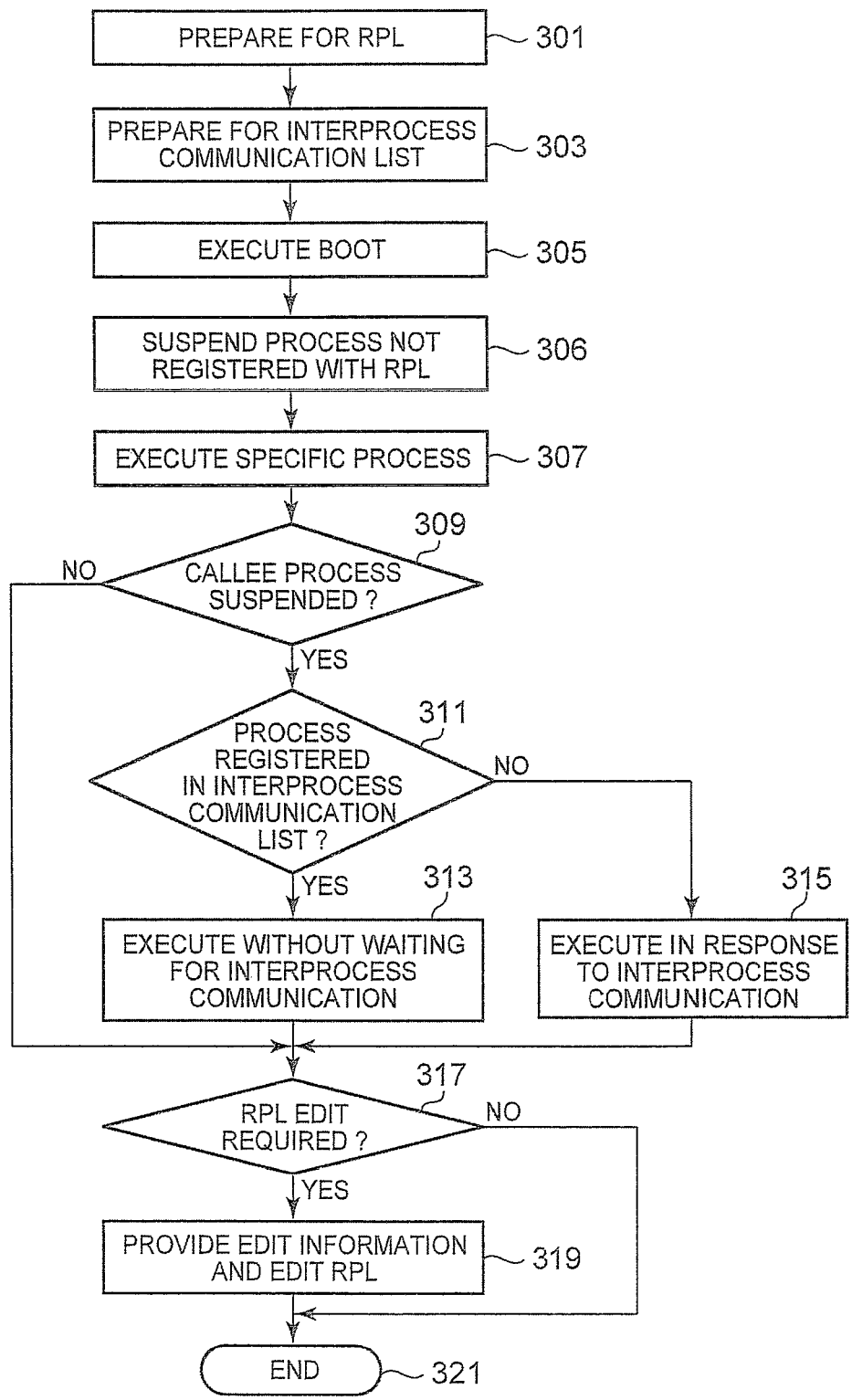
FIG. 6 is a flowchart of a method for using a RPL.

FIG. 6 is a flowchart of a method for using the RPL 107 created in accordance with the method shown in FIG. 4. At block 301, the RPL 107 created until the last boot in accordance with the procedure of FIG. 4 is loaded into the main memory 13. The RPL 107 registers a list of processes that are permitted to ran during booting. At block 303, the interprocess communication list 111 is loaded into the main memory 13. The interprocess communication list 111 registers a list indicating a dependence of a caller process and a callee process conducting interprocess communication before the last shutdown. At block 305, the boot starts.

First, an initialization program called Power On Self Test (POST) of BIOS stored in the BIOS ROM 21 is loaded into the main memory 13 for running. The initialization program diagnoses a boot device or initializes the same. Next, the BIOS searches for the HDD 17 that stores a boot file. The boot file is configured with programs of groups 1, 2 and 4 in Table I.

The BIOS loads a Master Boot Record (MBR) stored in a leading sector of the HDD 17 into the main memory 13 and transfers control thereto. The MBR searches for a partition that can be booted from a disk, loads a bootstrap loader residing at a leading sector (boot sector) thereof into a main memory, and transfers control thereto. Thereafter, following the bootstrap loader, programs of groups 1, 2, and 4 are loaded into the main memory 13 in a predetermined order. An OS performing preemptive multitasking is configured to perform preemptive task switch also during booting. In order to automatically load programs of the OS from the HDD 17 during booting, the OS creates multiple processes. Further, Explorer of the OS also creates a process to automatically load a program registered with startup or a registry. On the process list 65 is written a process ID of a process created by running an API function.

The created process is run while transiting between a ready state and a run state under the control of the process scheduler 67, thus loading a corresponding program code for each time slice. A program loaded starts automatically running or waits for being called from another process in a loaded state. The process control unit 103 does not conduct any control for the creation of a process to boot a program. Thus, since all processes for loading are created, the boot file can secure a sheared resource required for interprocess communication. When the process securing the shared resource during suspension is called by another process, the process can be resumed triggered by the generation of the interprocess communication.

At block 305, the boot system 100 is loaded for running halfway through the booting. After a predetermined number of processes of the OS is created, at block 306, the process control unit 103 starts to control the processes while referring to the RPL 107. The process control unit 103 compares the processes registered with the RPL 107 and the processes described in the process list 65. When the process control unit 103 finds, in the process list 65, a process not registered with the RPL 107, the process control unit 103 runs a specific API function with respect to the process scheduler 67 to make the process transit to a suspend state. Thereafter, the process transitioned to a suspend state keeps the state unless the process control unit 103 runs an API function for resuming.

As a result, the suspended process is in a run state for a short time period corresponding to the allocated time slice from the creation to suspension, and may stop in a state of only a partial code of the program being loaded. Since all amount of data scheduled is not loaded, such a program does not operate. When the process control unit 103 finds, in the process list 65, a process registered in the RPL 107, the process control unit 103 does not conduct any control thereto. Thus, only the processes registered with the RPL 107 transit between a run state and a ready state, so that the boot proceeds. Since the number of processes registered with the RPL 107 is much smaller than the number of processes described in the process list 65, the boot time can be shortened.

At block 307, a process (caller process) to run an application or the like is created before the completion of the boot or after the completion of the boot, so as to call another process (callee process). At block 309, the process control unit 103 makes an inquiry to the process management unit 63 as to whether the callee process is suspended or not. If the callee process is not suspended, the procedure goes to block 317. If the callee process is suspended, since it has to be resumed, the procedure goes to block 311, where the process control unit 103 makes an inquiry to the interprocess communication monitoring unit 109 as to whether the caller process is registered with the interprocess communication list 111 or not.

If it is determined that the caller process is registered with the interprocess communication list 111, at block 313, the process control unit 103 resumes the corresponding callee process described in the interprocess communication list 111 without waiting for interprocess communication. The resumed process is transitioned to a ready state by the process scheduler 67. As a result, the suspended process can be run without consuming overhead by the interprocess communication. If it is determined at block 311 that the process not registered with the interprocess communication list 111 is called, at block 315, the process control unit 103 runs a specific API function, triggered by the interprocess communication monitoring unit 109 recognizing the generation of interprocess communication to the callee process, and makes the process scheduler 67 resume the callee process. In this case, the time before resume will be longer than the procedure of block 313 because of starting of the interprocess communication or access to the shared resource management unit 75.

At block 317, a user determines whether or not the editing of the RPL 107 is necessary via the interface screen provided by the boot management unit 101. If the user determines that the editing of the RPL 107 is necessary, the boot management unit 101 searches for a process with a less running frequency among the processes registered with the RPL 107 through the execution process list 105 and displays the same on the LCD 19 at block 319. The display contents can be a list of types of processes, such as a process that is never run after the program is introduced, a process that is run only immediately after the introduction, a process that is never run within the latest one week, and a process that is never booted within the latest ten boots. When the user determines and selects a process that can be deleted from the RPL 107 based on the display contents, the RPL management unit 113 deletes such a process from the RPL 107.

G. Process Control Using a SPL

Figure 7:
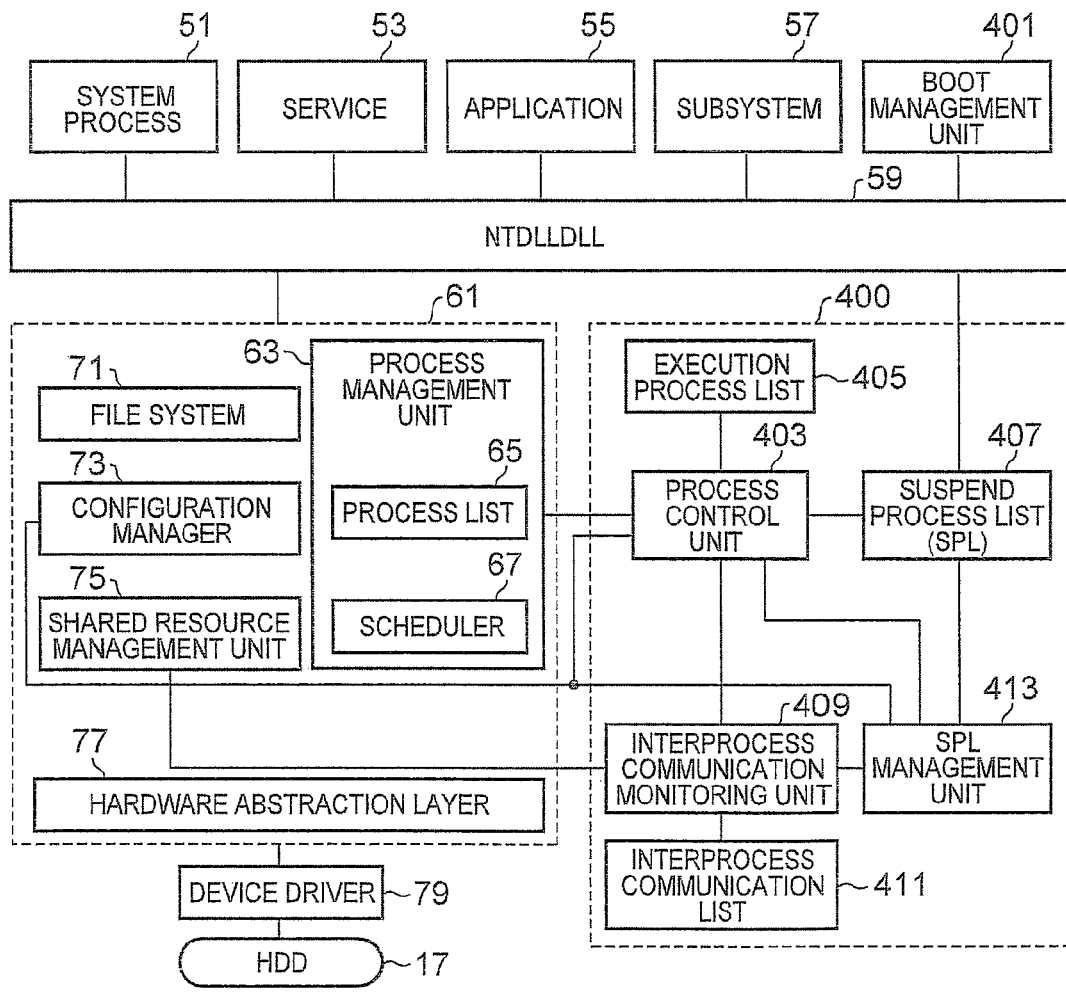
FIG. 7 is a block diagram of a software configuration of an operation environment using a SPL.

The above-mentioned description is the description of a method for controlling a process during booting by creating the RPL 107 with processes permitted to run during booting being registered therein. However, the present invention is also capable of conducting process control by creating a suspend process list (SPL) with processes to be suspended during booting registered therein. FIG. 7 is a functional block diagram illustrating a software configuration for configuring an operation environment using a SPL. A boot system 400 of FIG. 7 is different from FIG. 2 in that a SPL 407 and a SPL management unit 413 are provided instead of the RPL 107 and the RPL management unit 113 of FIG. 2. Operations of elements constituting the boot system 400 are described with reference to flowcharts of FIG. 8 and FIG. 9.

Figure 8:
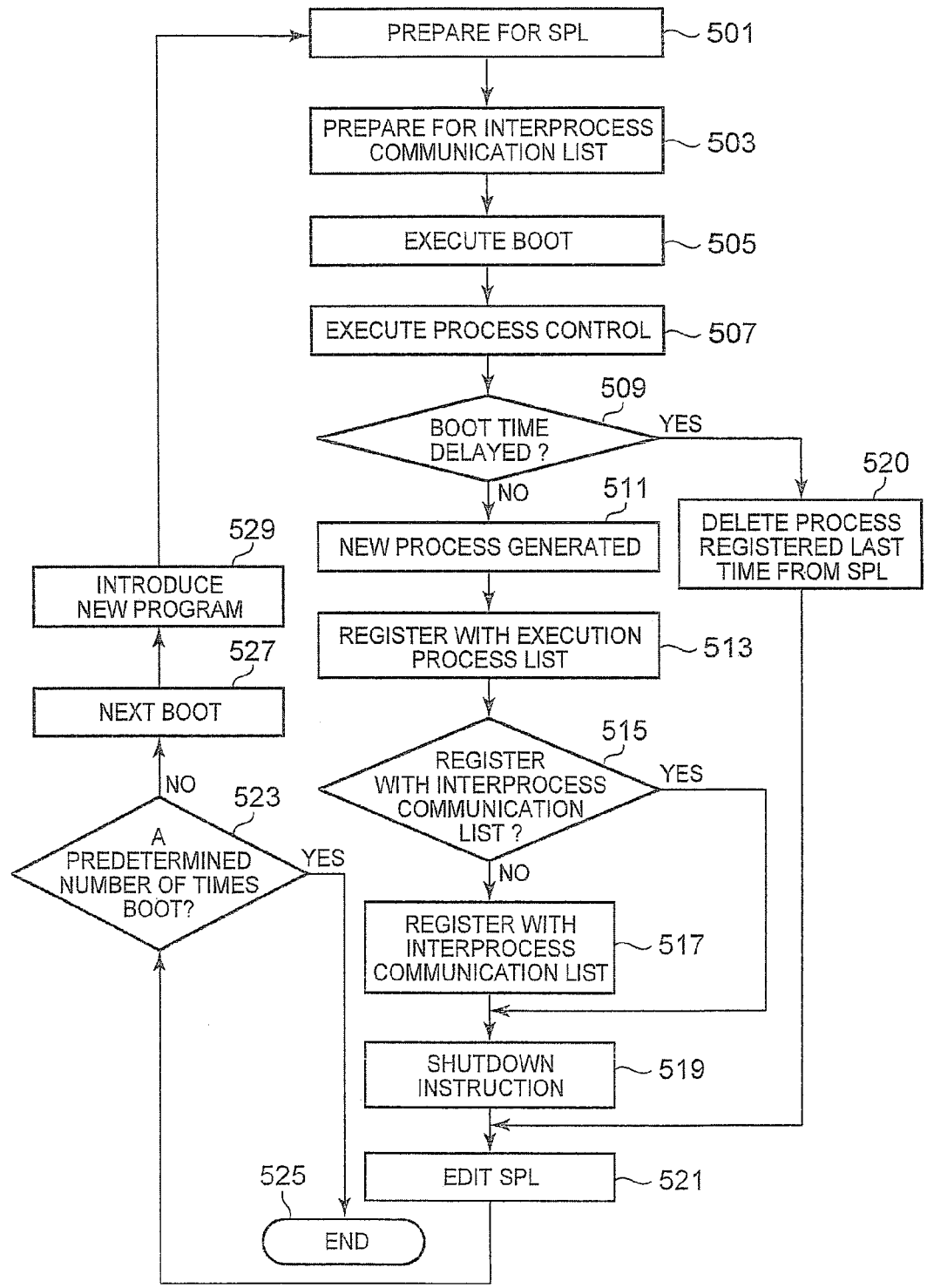
FIG. 8 is a flowchart of a method for generating a SPL.

FIG. 8 is a flowchart of a method for generating the SPL 407. The SPL 407 is referred to by a process control unit 403 so as to control suspend/run of a process to load a boot file. At block 501, the SPL 407 is loaded into the main memory 13. As the number of processes registered with the SPL 407 is larger, the boot can be completed in a shorter time to configure a running environment for a specific application. However, if a process required for the computer operation is registered with the SPL 407, the operation of the computer might stop, become unstable, or delay the boot, and therefore processes registered have to be selected appropriately. In the present embodiment, processes registered are selected based on the usage of the computer 10, thus creating the SPL 407. First, a blank SPL 407 is prepared without any process registered therein. At block 503, a blank interprocess communication list 411 with any process dependence not registered therein is loaded in the main memory 13.

At block 505, the computer 10 is switched on to execute boot. At block 507, suspend/run control is conducted with respect to processes of a boot file, the detail of which will be described with reference to FIG. 9. After the completion of boot, at block 509, the process control unit 403 determines whether this boot time is longer or not than the last boot time by a predetermined time length. The procedure of FIG. 8 repeatedly conducted by executing the boot several times possibly leads to a decrease in boot time at first but an increase in boot time at a certain timing. At this time, the increase in boot time means that a process not to be registered with the SPL 407 was registered and was suspended during booting.

When the boot time is not delayed, the process goes to block 511. At block 511, a process resulted from a program that is newly run after boot is generated. At block 513, the process control unit 403 registers all processes run by that time with an execution process list 405.

At block 515, an interprocess communication monitoring unit 409 acquires information on interprocess communication from the shared resource management unit 75, and determines whether a dependence including a caller process and a callee process is registered with an interprocess communication list 411 or not. When it is not registered, at block 517, the interprocess communication monitoring unit 409 registers the process dependence with the interprocess communication list 411. At block 519, a shutdown instruction is issued to the computer 10 through the input device 15. In accordance with the shutdown instruction, at block 521, the SPL management unit 413 selects a process added to the SPL 407. The SPL management unit 413 acquires a list of the all processes corresponding to all executable programs stored in the HDD 17 and registered with the registry of the configuration manager 73, compares the same with the execution process list 405, and add, to the SPL 407, not-run processes corresponding to not-run programs that are understood but not yet run.

The not-run processes include a process corresponding to a loaded program and a process corresponding to a not-loaded program. The SPL management unit 413 further refers to the interprocess communication list 411 and the configuration manager 73 to determine that a callee process that is not registered in the registry as a target of auto-run and that is called by a process as Explorer of Windows® is a process to run a program called by a program run in accordance with a user's operation, and adds such a process to the SPL 407. For instance, services such as printer spooler, quick launcher of an application, filter of Internet Explorer®, modem service and data base access do not interfere with operation even when they are run on demand after the completion of boot, and therefore they are registered with the SPL 407.

At block 509, if this boot time is delayed, it is expected that the SPL 407 used for this boot registers an important process so that a process in a suspend state cannot be run. At block 520, the SPL management unit 413 deletes, from the SPL 407, processes registered with the SPL 407 during the time between the last boot and this boot. Then, at block 521, the SPL management unit 413 can make the thus deleted processes out of a registration target in the next boot or later. Herein, a user can set, through a boot management unit 401, a predetermined number of OS core processes as processes that are prohibited from registration with the SPL 407 beforehand.

At block 523, the boot management unit 401 determines whether boot has been conducted a predetermined number of times or not. In the case where the boot has been finished the predetermined number of times, the SPL 407 registers processes after deleting minimum required processes for boot that can be ready to any user's usage environment, and after switched on the computer, control for running permission and suspending is conducted using the SPL 407, whereby the computer can arrive at such an operation environment in a short time. At block 525, the SPL management unit 413 finishes editing of the SPL 407, and the process control unit 403 uses the edited SPL 407 to execute process control at the next boot.

At block 527, the next boot is conducted after shutdown of the computer 10. Then, at block 529, a new program may be introduced into the computer 10. The SPL management unit 413 may make all of the newly introduced programs after the completion of the editing of the SPL 407 and a service program called only from the program registered with the SPL 407. Alternatively, the SPL management unit 413 may make all programs introduced after introduction of the OS into the computer 10 registered with the SPL 407. When the procedure in the next boot returns from block 529 to block 501, the SPL management unit 413 edits the SPL 407 in the next operation environment.

H. Procedure of Process Control Using a SPL

Figure 9:
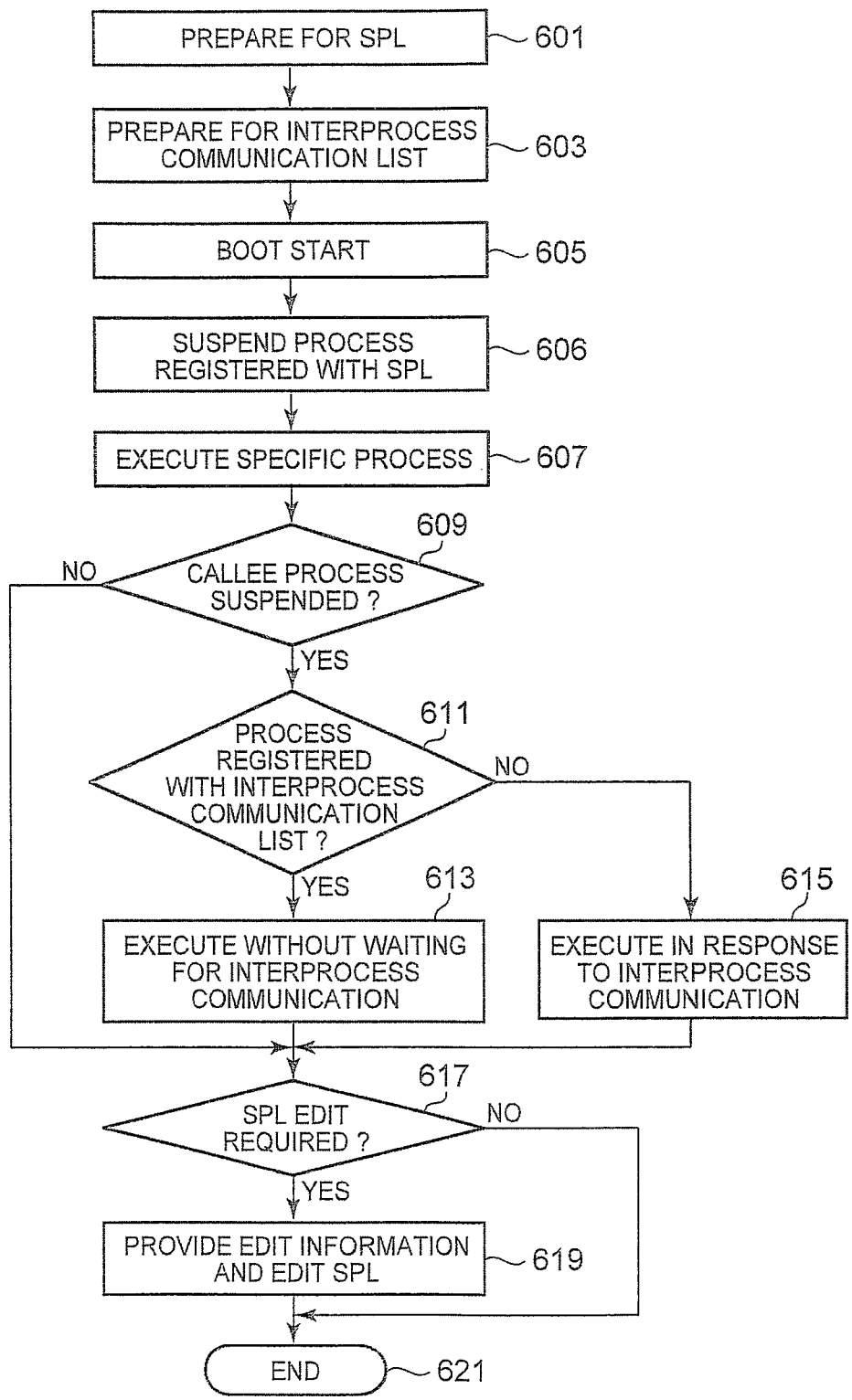
FIG. 9 is a flowchart of a method for using a SPL.
Figure 10:
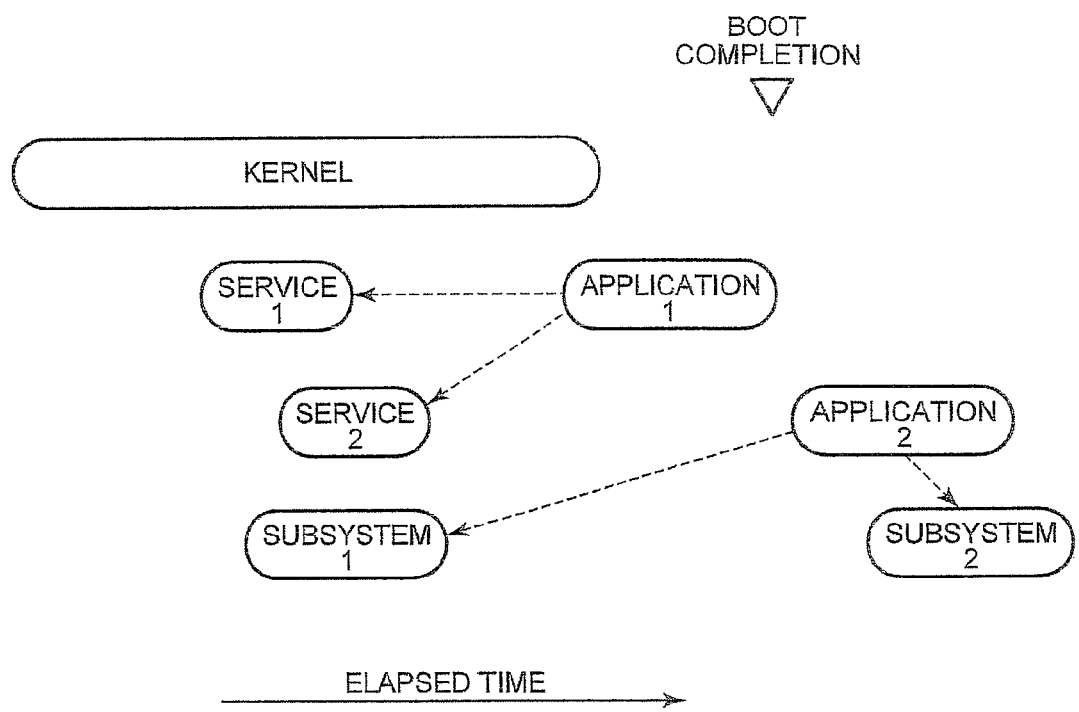
FIG. 10 illustrates a state of loading a boot file in a computer.

FIG. 9 is a flowchart of a method for using the SPL 407 created in accordance with the method shown in FIG. 8. At block 601, the SPL 407 created until the last boot in accordance with the procedure of FIG. 8 is loaded into the main memory 13. The SPL 407 registers a list of processes that are suspended during booting. At block 603, the interprocess communication list 411 is loaded into the main memory 13. At block 605, the boot starts, and the boot system 400 is loaded as a part of a boot file for running.

After a predetermined number of processes of the OS has been created, at block 606, the process control unit 403 starts to control the processes while referring to the SPL 407. The process control unit 403 compares the processes registered with the SPL 407 and the processes described in the process list 65. When the process control unit 403 finds, in the process list 65, a process registered with the SPL 407, the process control unit 403 runs an API function with respect to the process scheduler 67 to make the process transit to a suspend state. Therefore, the processes not registered with the SPL 407 only transit between a run state and a ready state, so that the boot proceeds. Since the number of processes loading a boot file that are not registered with the SPL 407 is much smaller than the number of processes described in the process list 65, the boot time can be shortened.

At block 607, a process (caller process) to run an application or the like is created before the completion of the boot or after the completion of the boot, so as to call another process (callee process). At block 609, the process control unit 403 makes an inquiry to the process management unit 63 as to whether the callee process is suspended or not. If the callee process is not suspended, the procedure goes to block 617. If the callee process is suspended, since it has to be resumed, the procedure goes to block 611, where the process control unit 403 makes an inquiry to the interprocess communication monitoring unit 409 as to whether the caller process is registered with the interprocess communication list 411 or not.

If it is determined that the caller process is registered with the interprocess communication list 411, at block 613, the process control unit 403 resumes the callee process through an API function without waiting for interprocess communication. If it is determined at block 611 that a process not registered with the interprocess communication list 411 is called, at block 615, the process control unit 403 runs a specific API function, triggered by the interprocess communication monitoring unit 409 recognizing the generation of interprocess communication to the callee process, and makes the process scheduler 67 resume the callee process.

At block 617, a user determines whether the editing of the SPL 407 is necessary or not through the interface screen provided by the boot management unit 401. If the user determines that the editing of the SPL 407 is necessary, the boot management unit 401 searches for a process with a less running frequency among the processes not registered with the SPL 407 through the execution process list 405 and displays the same on the LCD 19 at block 619. The display contents can be a list of types of processes, such as a process that is never run after the program is introduced, a process that is run only immediately after the introduction, a process that is never run within the latest one week, and a process that is never run within the latest ten boots. When the user determines and selects a process that can be registered with the SPL 407 based on the display contents, the SPL management unit 413 adds such a process to the SPL 407.

The flowchart of FIG. 4 describes a method for generating the RPL 107, and the flowchart of FIG. 8 describes a method for generating the SPL 407. However, a SPL may be created by the procedure of FIG. 4, and a RPL may be created by the procedure of FIG. 8. In this case, processes registered with the RPL created by the procedure of FIG. 4 can be excluded from processes corresponding to all executable programs registered with the registry of the configuration manager, thus creating a SPL, and processes registered with the SPL created by the procedure of FIG. 8 can be excluded from processes corresponding to all executable programs registered with the registry of the configuration manager, thus creating a RPL.

In the methods shown in FIG. 4 and FIG. 8, the RPL 107 and the SPL 407 are created considering any operation environment for a user so that a program that does not have to automatically boot is suspended and is run on demand if needed. In the present invention, however, a RPL and a SPL specialized for a specific operation environment such as browsing of websites or reproduction of moving images can be created. In such a case, the number of times of boot at block 223 of FIG. 4 and at block 523 of FIG. 8 may be selected to a degree enabling determination of a process running state in the operation environment.

As has been described, the present invention provides a method for shortening the boot time of a computer system.

It is also important to note that although the present invention has been described in the context of a fully functional computer, those skilled in the art will appreciate that the mechanisms of the present invention are capable of being distributed as a computer program product in a variety of computer-readable storage medium such as compact discs.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   providing a computer with a run process list (RPL), wherein said computer includes a boot medium having a boot file;
   registering a plurality of processes with said RPL;
   in response to said computer being boot up, comparing a predetermined number of processes within a process list to said plurality of processes registered with said RPL, wherein said predetermined number of processes were generated by an operating system;
   changing processes in said process list from a run state to a ready state when said processes in said process list are registered with said RPL;
   changing remaining of said processes in said process list from said run state to a suspend state; and
   continuing said boot up to generate a plurality of caller processes and callee processes from said processes in said ready state, wherein said caller processes are configured to execute an application program, and said callee processes are configured to call another process.

2. The method of claim 1, further comprising
   determining whether or not any of said callee processes is in said suspend state;
   in a determination that one of said callee processes is in said suspend state, determining whether or not said callee process is within an interprocess communication list;
   in a determination that said callee process is within said interprocess communication list, executing said callee process without waiting for an interprocess communication.

3. The method of claim 2, further comprising in a determination that said callee process is not within said interprocess communication list, executing said callee process in response to an interprocess communication.

4. The method of claim 1, further comprising acquiring an identifier of a process executed by said computer.

5. The method of claim 1, wherein said method further includes:
   registering all processes corresponding to executable programs stored in said boot medium with said RPL; and
   deleting a process corresponding to a not-run program among said executable programs from said RPL.

6. The method of claim 5, further comprising deleting a process to run a program called by a program run in response to a user's operation from said run process list.

7. The method of claim 5, further comprising:
   executing boot up a plurality of times;
   measuring time periods of said boot ups; and
   when a time period of boot up current time has been delayed longer than a time period of boot up previous time, returning a process deleted from the run process list after said boot up previous time to said RPL.

8. The method of claim 5, wherein said RPL does not register processes related to a program introduced after generating said RPL and to a program called only from said program introduced after generating said RPL.

9. The method of claim 1, further comprising acquiring an identifier of a process executed by said computer, wherein said process list includes a suspend process list with processes suspended registered therein.

10. The method of claim 9, wherein said process list includes:
    preparing a suspend process list that is not registered;
    acquiring a list of all processes corresponding to executable programs stored in said boot medium; and
    adding, to said suspend process list, a process corresponding to a not-run program obtained by deleting said run process from a list of all processes.

11. The method of claim 10, further comprising adding a process to run a program called by a program run in response to a user's operation to said suspend process list.

12. The method of claim 10, further comprising:
    executing boot up a plurality of times;
    measuring time periods of said boot ups; and
    when a time period of boot up current time is delayed than a time period of boot up previous time, deleting a process added to said suspend process list after said boot up previous time from said suspend process list.

13. The method of claim 9, further comprising registering, with said suspend process list, processes related to a program introduced after creating said suspend process list and to a program called only from said program introduced after creating said suspend process list.

14. A computer system, comprising:
    a boot medium for storing a boot file containing an operating system;
    a run process list having a list of registered processes capable of being run during booting;

a suspend process list with a list of processes being suspended during booting; and a control module for running a process in accordance with said run process list, and suspending a process in accordance with said suspend process list, wherein said control module resumes any suspended process when an application program calls said suspended process after the completion of booting during an interprocess communication, wherein said control module refers to an interprocess communication list and recognizes said suspended process being called by a process running said application program to resume said suspended process.

15. The computer system of claim 14, wherein said run process list registers a process remaining after deleting, from all processes corresponding to executable programs introduced to the computer, a process corresponding to a program that is not run during operation of the computer and a process to run a program called by a program run in response to a user's operation.

16. The computer system of claim 14, wherein said control module prohibits registration with the run process list of a process to run a program that is introduced after said operating system is introduced to the computer.

17. The computer system of claim 16, wherein said suspend process list registers a process corresponding to a program that is not run during operation of said computer system and a process to run a program called by a program run in response to a user's operation.

18. The computer system of claim 15, wherein said suspend process list registers a process to run a program that is introduced after said operating system is introduced to said computer system.

* * * * *